US009713083B2

(12) United States Patent
Toskala et al.

(10) Patent No.: US 9,713,083 B2
(45) Date of Patent: Jul. 18, 2017

(54) LTE ADVANCED SERVICE INDICATOR

(71) Applicant: Nokia Corporation, Espoo (FI)

(72) Inventors: Antti A. Toskala, Espoo (FI); Sari Kaarina Nielsen, Espoo (FI); Tuomo Saynajakangas, Oulunsalo (FI)

(73) Assignee: Noki Technologies Oy, Espoo (FI)

( * ) Notice: Subject to any disclaimer, the term of this patent is extended or adjusted under 35 U.S.C. 154(b) by 97 days.

(21) Appl. No.: 14/470,103

(22) Filed: Aug. 27, 2014

(65) Prior Publication Data

US 2015/0063143 A1    Mar. 5, 2015

Related U.S. Application Data

(60) Provisional application No. 61/870,947, filed on Aug. 28, 2013.

(51) Int. Cl.
*H04W 48/20* (2009.01)

(52) U.S. Cl.
CPC .................. *H04W 48/20* (2013.01)

(58) Field of Classification Search
CPC .................................. H04W 36/30
See application file for complete search history.

(56) References Cited

U.S. PATENT DOCUMENTS

2008/0267109 A1* 10/2008 Wang .................. H04W 72/005
                                                                        370/312
2013/0102268 A1*  4/2013 Wang ...................... G01S 19/34
                                                                        455/343.2

(Continued)

FOREIGN PATENT DOCUMENTS

GB          2514365    * 11/2014   ............ H04W 4/00

OTHER PUBLICATIONS

"3$^{rd}$ Generation Partnership Project; Technical Specification Group Radio Access Network; Evolved Universal Terrestrial Radio Access (E-UTRA); Requirements for support of radio resource management (Release 12)", 3GPP TS 36.133 V12.0.0, Jul. 2013, 746 pgs.

(Continued)

*Primary Examiner* — Albert T Chou
(74) *Attorney, Agent, or Firm* — Harrington & Smith

(57) ABSTRACT

In accordance with the exemplary embodiments there is at least an apparatus and method to perform receiving an indication of advanced services of an area associated with the communication network, in response to the indication of advanced services, determining a relative performance improvement of the advanced services for the device, and based on the determined relative performance improvement, setting an indication flag at the device. Further, in accordance with the exemplary embodiments, perform sending towards a user equipment information including an indication of an advanced service area available to the user equipment, where the information is for use by the user equipment in determining whether accessing the advanced service area would provide a relative operational performance to the user equipment, and in response to the sending, receiving an indication of one of the user equipment displaying an indication of the advanced service area, and the user equipment accessing the advanced service area.

19 Claims, 4 Drawing Sheets

(56) References Cited

U.S. PATENT DOCUMENTS

| | | | | |
|---|---|---|---|---|
| 2013/0322342 A1* | 12/2013 | Mistry | ............... | H04W 48/18 |
| | | | | 370/328 |
| 2014/0204848 A1* | 7/2014 | Geirhofer | ............. | H04B 7/024 |
| | | | | 370/329 |
| 2015/0016416 A1* | 1/2015 | Hawkes | ............ | H04W 36/0016 |
| | | | | 370/331 |

OTHER PUBLICATIONS

"Way forward on service indicator for LTE-Advanced", NTT DOCOMO, Inc., 3GPP TSG-RAN WG2 #82, R2-131925, May 2013, 2 pgs.

* cited by examiner

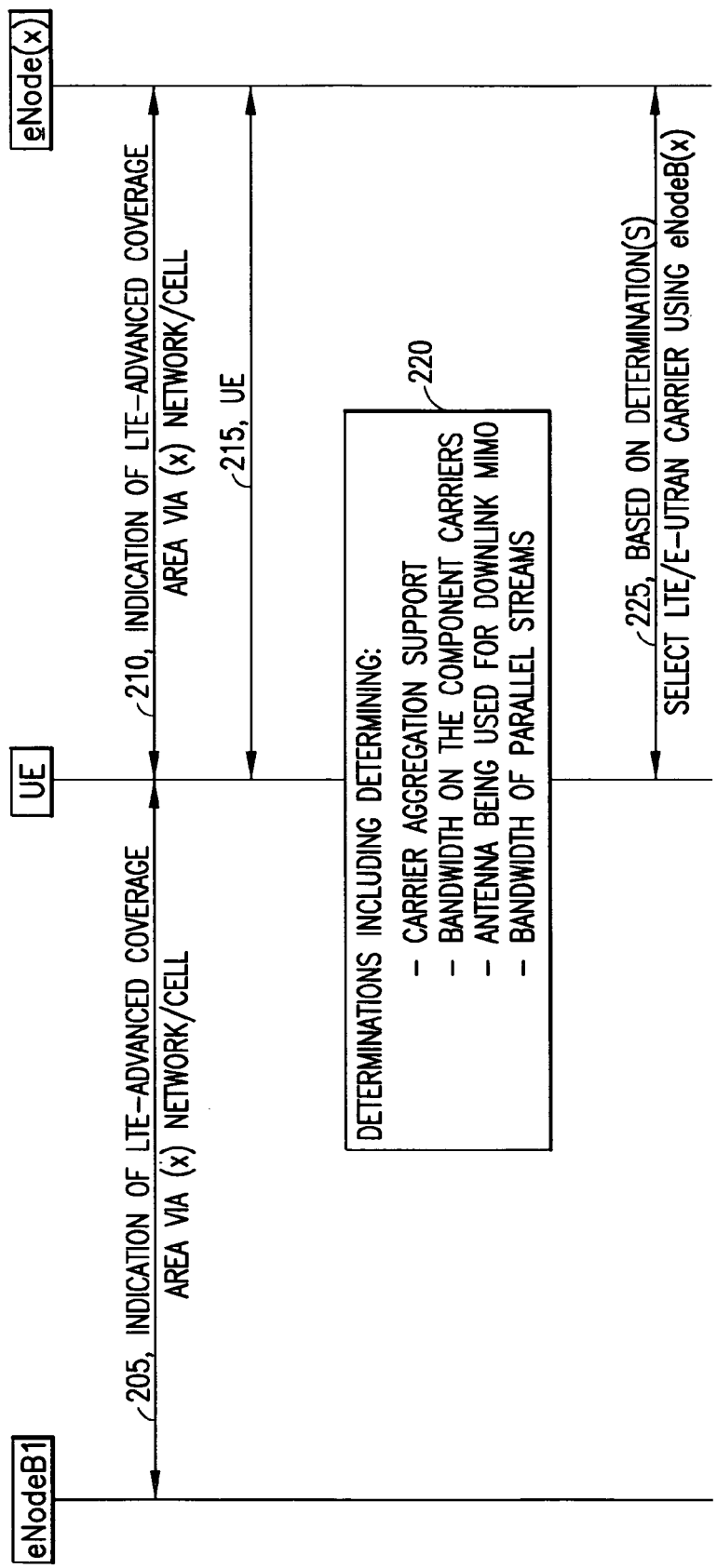

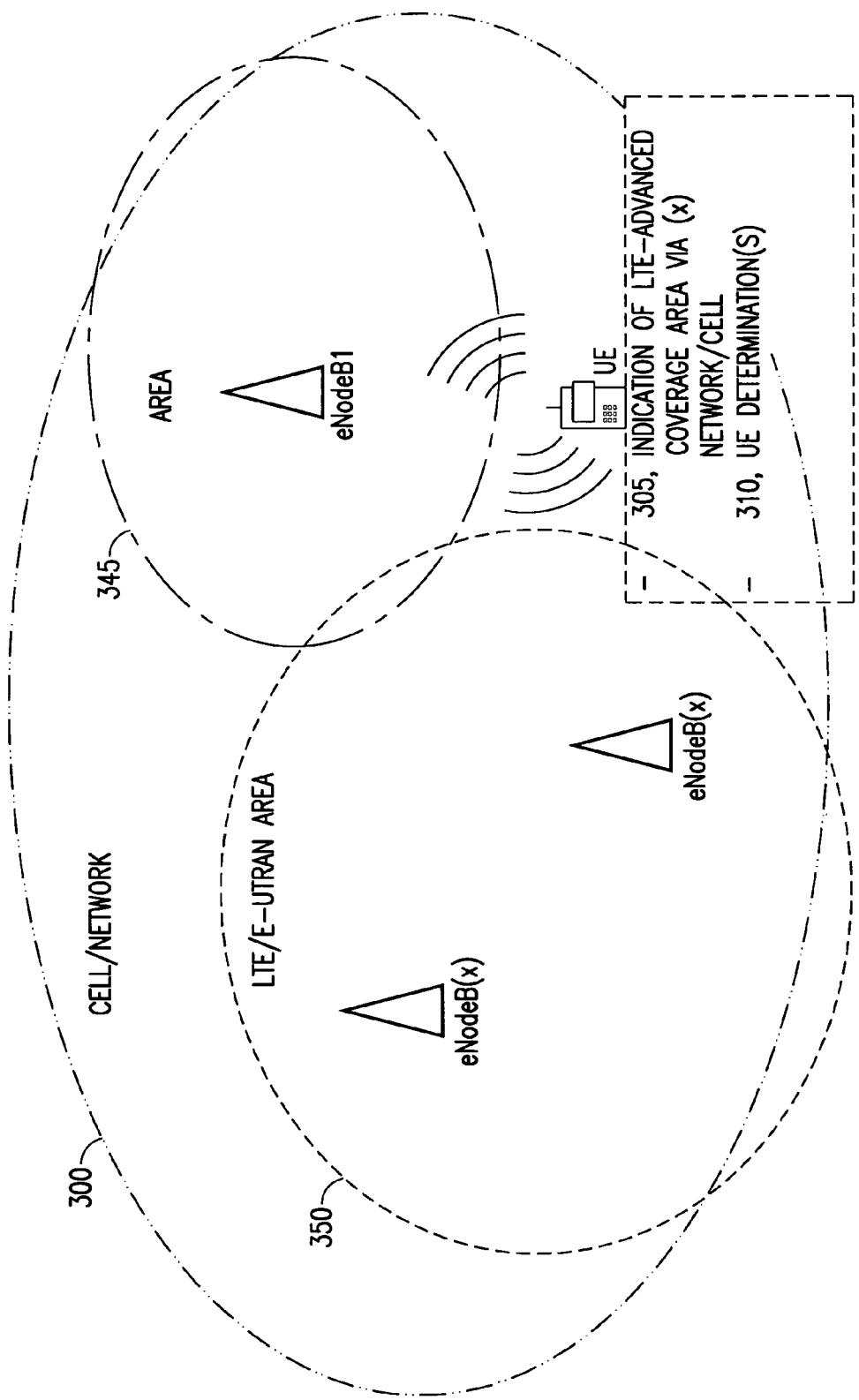

LTE ADVANCED SERVICE INDICATOR

CROSS-REFERENCE TO RELATED APPLICATIONS

This application claims priority from U.S. Provisional Application No. 61/870,947, filed on Aug. 28, 2013 and incorporated herein by reference in its entirety.

TECHNICAL FIELD

The teachings in accordance with the exemplary embodiments of this invention relate generally long term evolution (LTE) wireless networks and telecommunications. More specifically, the exemplary embodiments of the invention relates to an LTE Advanced service indicator and indicator triggering mechanisms.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
BCH broadcast channel
CA carrier aggregation
CSI channel state information
CQI channel quality indicator
GSM global system for mobile communications
HetNet heterogeneous networks
HSDPA high speed downlink packet access
HSDPA high speed uplink packet access
HSPA high speed packet access
eICIC non-CA based inter-cell interference coordination
LTE long term evolution
MDT minimization of drive test
MIMO multiple input multiple output
RSRP reference signal received power
RSRQ reference signal received quality
SON self-organizing networks
TM transmission mode
UMTS universal mobile telecommunications system LTE, an acronym of long-term evolution, is marketed as 4G LTE. LTE is a standard for wireless communication of high-speed data for mobile phones and data terminals which is based on the GSM/EDGE and UMTS/HSPA network technologies. LTE provides core network improvements for an increased capacity and speed.

SUMMARY

In an exemplary aspect of the invention, there is a method comprising: receiving, with a device of a communication network, an indication of advanced services of an area associated with the communication network; in response to the indication of advanced services, determining a relative performance improvement of the advanced services for the device; and based on the determined relative performance improvement, setting an indication flag at the device.

In an exemplary aspect of the invention, there is an apparatus comprising: at least one processor; and at least one memory including computer program code, where the at least one memory and the computer program code are configured, with the at least one processor, to cause the apparatus to at least: receive an indication of advanced services of an area associated with the communication network; in response to the indication of advanced services, determine a relative performance improvement of the advanced services for the device; and based on the determined relative performance improvement, set an indication flag at the device.

In another exemplary aspect of the invention, there is a method comprising: sending by a network device towards a user equipment information including an indication of an advanced service area available to the user equipment, where the information is for use by the user equipment in determining whether accessing the advanced service area would provide a relative operational performance to the user equipment; and in response to the sending, receiving an indication of one of the user equipment displaying an indication of the advanced service area, and the user equipment accessing the advanced service area.

In another exemplary aspect of the invention, there is an apparatus comprising: at least one processor; and at least one memory including computer program code, where the at least one memory and the computer program code are configured, with the at least one processor, to cause the apparatus to at least: send towards a user equipment information including an indication of an advanced service area available to the user equipment, where the information is for use by the user equipment in determining whether accessing the advanced service area would provide a relative operational performance to the user equipment; and in response to the sending, receive an indication of one of the user equipment displaying an indication of the advanced service area, and the user equipment accessing the advanced service area.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 illustrates a communication flow chart of a method in accordance with the exemplary embodiments of the invention;

FIG. 3 illustrates a feature of a user equipment autonomously evaluating a validity and/or basis for an LTE-Advanced service indication information in accordance with the exemplary embodiments of the invention.

DETAILED DESCRIPTION

Figure 1:
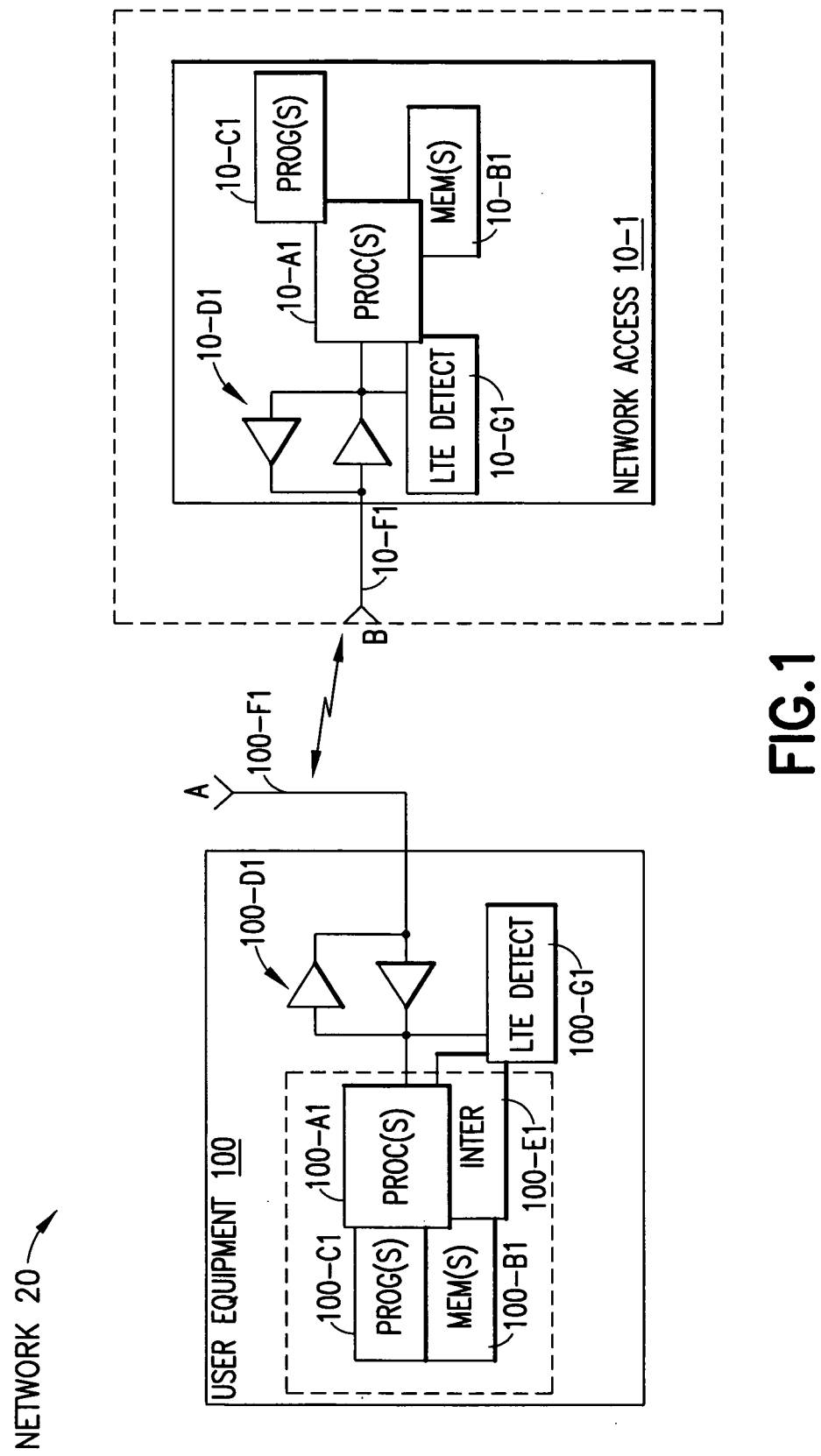
FIG. 1 is a simplified block diagram of various devices suitable for use in practicing the exemplary embodiments of the invention.

It has been considered to enable a mobile device such as a user equipment (UE) to indicate on a display whether a particular cell supports "LTE-Advanced" This type of indicator could be seen to indicate whether a cell supports high speed downlink packet access (HSDPA) or high speed uplink packet access (HSUPA). For example, an indicator labeled as lte-AdvCellIndicator has been proposed. This lte-AdvCellIndicator would indicate that a serving cell supports at least one of LTE-Advanced features.

Based on such a display indication a UE may consider that the serving cell is part of the LTE-Advanced coverage area. This indicator would not be used for any other purpose. It is noted that LTE-Advanced features can include for example carrier aggregation and higher order MIMO with TM9 capabilities.

However, considering this approach there are seen to be problems in that providing an indication, such as by using a single bit on broadcast control channel BCH, to indicate whether the cell supports "LTE-Advanced" does not provide reliable indication to the end user if an available LTE-Advanced network would improve the end-user experience and performance. Such performance related to high speed downlink packet access (HSDPA) and/or high speed uplink packet access (HSUPA). In addition, notably there are key differences between HSDPA and HSUPA as introduced in LTE-Advanced introduced. Such differences can include differences in features like LTE CA and higher order MIMO or higher order modulation such as 256 QAM, to name only a few. Therefore, as such a single bit indicator would not be able to differentiate between the different LTE-advanced features or their benefits to a user of a user device for example. Other aspects, which makes one bit indicator less attractive for LTE-Advanced, such as for HSDPA or HSUPA, is that LTE and thus LTE-Advanced may have different bandwidths. Therefore, for at least these reasons a simple indication of support of LTE-Advanced features alone does not assure better user throughput, end-user experience or better system capacity than regular LTE or LTE with a wider BW.

One reason is that an indication based on whether a network may have LTE Carrier Aggregation alone does not necessarily indicate an end-user benefit in that network. In terms of achievable data rates, if a total aggregated bandwidth (BW) after carrier aggregation is not more than what normal "single carrier" (e.g., 20 MHz LTE) operations enabled by such an area would not provide any improvement from a UE perspective. In addition, LTE-Advanced also contains features which are not directly visible for the end-user such as to confirm or preclude an improvement. Some of these types of features which could help determine an actual improvement may include for example information of minimization of drive tests (MDT) features, self-organizing networks (SON), Heterogeneous Networks (HetNet), and non-CA based Inter-Cell Interference Coordination (el-CIC) features.

In accordance with the exemplary embodiments of the invention there is a at least a method and apparatus to define criteria and to filter out scenarios that would indicate better end-user expectations. A advantage would be to indicate to a user of a user equipment, with an LTE-Advanced service indicator, that an improvement would be had in an LTE-Advanced service such that an expected peak data rate can be achieved or a clear improvement in the data rate than what is normally expected to be achieved (when no performance enhancing LTE-Advanced features are available).

Before discussing the invention in detail reference will be made to FIG. 1. FIG. 1 illustrates an overview of one environment where the exemplary embodiments of the invention interference suppression may be practiced. FIG. 1 is a block diagram having a network access node 10 communicating in a network 20. The network 20 can include wireless/wired networks and more than one cell and/or area. Different cells/areas may support different features including advanced LTE features as at least discussed herein. In accordance with the exemplary embodiments of the invention, communications between devices, such as the devices as illustrated in FIG. 1, can include direct communication, communication via another device that is of the network or outside the network and/or via the Internet. In addition, any part or all of these communications may be offloaded to a $3^{rd}$ party network or device. The network access node 10-1 includes one or more processors 10-A1, one or more memories 10-B1 containing one or more programs 10-C1, a radiofrequency transceiver 10-D1 able to receive and transmit data, an interface 10-E1, and one or more antennas 10-F1. It is noted that any of the interfaces 10-E1 and 100-D1 can comprise at least one of or a combination of a wired and/or wireless interface. The wireless interface may be referred to as an air interface. In addition, any of these interfaces can be configured to provide a wired, wireless, and/or backhaul connection interface.

In addition, the network access node 10-1 can each include an advanced LTE detection processor (LTEdetect) 10-G1 to process, detect, define criteria, and/or provide information for performing novel operations in accordance with the invention. Such as for providing information which can be used for determining and identifying advanced LTE features in various cells, networks, and/or areas to better satisfy end-user expectations. For instance, the network access node 10-1 could be a base station or an access node which is/are transmitting and/or receiving information pertaining to at least the novel features and criteria.

The user equipment 100, as in FIG. 1, includes one or more processors 100-A1, one or more memories 100-B1 containing one or more programs 100-C1, a radio frequency transceiver 100-D1 able to receive and transmit data, an interface 100-E1, and one or more antennas 100-F1. The interface 100-E1 is configured to operate as a wireless interface, also referred to as an air interface for communication with the network. Further, the user equipment 100 also includes an advanced LTE detection processor (LTEdetect) 100-G1 to process, detect, and define criteria for performing novel operations in accordance with the invention. In accordance with the exemplary embodiments of the invention, the LTE detection processor 100-G1 is configured to at least utilise the novel signaling information of the invention to allow the User Equipment 100 to at least process, detect, and define advanced LTE criteria for performing novel operations in accordance with the invention. The user equipment 100 can be any mobile equipment such as a cellular phone or other cellular device, and the network access node 10-1 could be a serving access node network of a cell where the User Equipment 100 is located. Further, as illustrated there may be a wired and/or wireless connections established with the network access node 10-1. Any of these connections may be used for communications of novel signaling and information in accordance with the exemplary embodiments of the invention.

As shown in FIG. 1, there exist several interconnections between the network parts shown by corresponding arrows or lines. These interconnections may be established by means of interfaces or reference points which may be different in dependence of the employed network technology and which are known to those skilled in the art. In accordance with the exemplary embodiments signaling including the LTE-Advanced service information can be sent from a network node such as the Network Access Node 10-1. As illustrated with the signal line A, advanced LTE detection information can be signaled to the User Equipment 100. In addition, in accordance with the embodiments advanced LTE detection information can be part of the system code of the User Equipment 100. Thus, the advanced LTE detection information can be input to the User Equipment 100 anytime during and after manufacture of the User Equipment 100. Further, signaling from a network node such as the Network Access Node 10-1 can include a command to cause the user equipment 100 to perform the advanced LTE detection in accordance with the invention.

In addition, in accordance with the exemplary embodiments of the invention at least the advanced LTE detection information can be forwarded via at least one other network device to the User Equipment 100 via its interface 10-E1, and/or to the network access node 10-1. Similarly, in accordance with the exemplary embodiments, the user equipment 100 can receive the information via its interface 100-E over the one or more antennas 100-F1. The user equipment 100 can use this information to perform the exemplary embodiments of the invention. In addition, the advanced LTE detection information in accordance with the exemplary embodiments may be signaled over an X2 interface which is available at both the network access node 10-1 and the user equipment 100.

As similarly stated above an indicator (e.g., lte-AdvCellIndicator) has been proposed to enable a mobile device such as a user equipment (UE) to indicate on a display whether a particular cell supports "LTE-Advanced." This indicator would be based on whether a serving cell supports at least one of LTE-Advanced features. Such an indicator would be based on a single bit sent on a BCH. This bit, and subsequently any such indicator as then shown on the UE screen, would indicate possible availability of advanced LTE features, such as HSDPA, and whether a cell/area supports "3.5 G." Such an indication would not indicate any guarantee that an end-user would actually get higher service performance than normally.

The indicator provided with this prior proposal does not inform a user whether a network using this simple LTE-Advanced service indicator would provide any end user benefits, for example in terms of throughputs as compared to other LTE cells without such feature. In this prior proposal for instance an operator operating LTE Carrier Aggregation (CA) of 5 MHz+5 MHz could provide an LTE-Advanced service indicator simply because an LTE CA is part of a cell or network. However, it is noted that this would not be an indication of improved performance as the cell or network could still be using a bandwidth that is not larger than a bandwidth currently in use at the user equipment. In this case this prior proposed LTE-Advanced service indicator could actually give false expectations to end users. Whereas, the exemplary embodiments of the invention relate to different LTE-Advance features and their benefits for setting criteria of when LTE-Advanced service indicator could be indicated. The criteria aim at ensuring that when the network sends LTE-Advanced service indicator, the end-user can obtain better service for example in terms of throughputs compared to normal LTE operations. This could be accomplished for example by determining whether a bandwidth of component carriers as counted together would exceed certain minimum value (of more than 20 MHz as based on LTE Release 8 for example) in order to ensure a data rate achievable for the end-user in such an network or cell would exceed normal LTE operations.

In accordance with the exemplary embodiments of the invention there is a at least a method and apparatus to define criteria to filter out scenarios that bring better end-user expectations so that LTE-Advanced service indicator is only shown to the end user if an expected improved peak data rate is to be achieved.

Exemplary Determining Criterion 1:

Associating an LTE-Advanced service indication to an LTE Carrier Aggregation (CA) such that a device, such as a UE, would determine whether a broadcasted LTE-Advanced service indicator indicates a valid potential improvement. Setting an LTE-Advanced service indication as 'true' and/or displaying the LTE-Advanced service indication would provide such an indication of validity and could be based on:

It is determined that TIE would be supporting carrier aggregation within one band (intra-band contiguous and/or intra-band non-contiguous carrier aggregation) or with at least two bands (inter-band carrier aggregation), and that at least two of the component carriers (and/or corresponding PCell and SCell(s)) would be available for aggregation, and It is determined that a bandwidth on the component carriers counted together would exceed certain minimum value (of more than 20 MHz bandwidth in total for example) in order to ensure data rate achievable for the end-user exceed normal LTE operations.

The exemplary embodiments of the invention provide at least a method and apparatus to confirm at indication at a UE that an access to an indicated LTE advanced network, cell or area would benefit the UE before the UE is allowed to indicate LTE-Advance service indicator at the UE. The UE knows its own capabilities like LTE CA support and bands supported. The UE can then check from the system information or other signaling information, such as to determine whether the network supports CA and whether the band or bands supported by the network for CA match with the UE's own CA band or band combinations.

Exemplary Determining Criterion 2:

Setting an LTE-Advanced service indication as 'true' and/or displaying the LTE-Advanced service indication could be based on:

It is determined that there are 4 or more antenna being used for downlink MIMO, and It is determined that a number of parallel data streams divided by 2 and multiplied by the total bandwidth available is exceeding 20 MHz.

Exemplary Determining Criterion 3:

Setting an LTE-Advanced service indication as 'true' and/or displaying the LTE-Advanced service indication could be based on:

It is determined that the CQI (or CSI information) value for 2 or more bands or carriers is resulting to aggregated peak data rate higher than what is the expected performance or the peak rate of the single frequency band being used.

In this comparison the relative bandwidths would be considered in such a way that if an operator would be using already 20 MHz bandwidth and then another band is barely usable with clearly smaller bandwidth, this would not justify setting up the indication, at least until the other band signal is determined be sufficiently good. This determination being based on e.g. RSRQ measurements or creation of the respective CQI/CSI value.

All of these determined scenarios to evaluate a validity and/or basis for an LTE-Advanced service indication would ensure that there are benefits from the end user point of view, and provide a basis for an LTE-Advanced service indication in accordance with the exemplary embodiments of the invention.

This LTE-Advanced service indicator could also be evaluated for example by having additional threshold for checking the availability and detection ability for a given UE (e.g. RSRP, RSRQ or CSI(CQI) based threshold) or alternatively the UE is required to have identified the corresponding Pcell and SCell(s) for enabling CA aggregation in practice. The cell identification rules would be linked to the UE cell identification requirements such as defined in TS36.133.

Additionally, a rule could be set at the UE or an eNodeB that if the UE moves out of the coverage area of one or more of the component carriers (i.e. from the coverage area of the corresponding PCell and SCell(s)), the indication is no longer valid and thus, no longer shown to the user. This additional rule could also be defined based on a threshold e.g. for RSRP, RSRQ or CSI (CQI) or based on cell still being detectable based on the UE requirements defined in TS36.133.

For LTE-Advanced MIMO operations an LTE-Advanced service indicator would only be shown to the user on the display if the UE is able to support advanced operations of the service. For example, an LTE-advanced service indicator may not be shown due to lower CSI level (i.e. lower signal quality conditions). Further, setting as true an LTE-advanced service indicator can be based whether a CSI or CQI type of reporting is extended to idle mode for the service area. It is noted, these conditions for setting true the indicator may be for future LTE extensions/enhancements only.

For validity the bandwidth on the component carriers counted together would need to exceed certain minimum value (of more than 20 MHz bandwidth in total for example) in order to ensure data rate achievable for the end-user exceed normal LTE operations. In case the operator bandwidth would be limited, for example 10 MHz, then enabling carrier aggregation from two or more bands, providing for example 20 MHz of total bandwidth or more would justify sending the indication by the eNodeB.

The other criteria for setting the LTE-Advanced service indication 'true' could be support of the 4 antenna (or more) downlink MIMO, with number of parallel data streams divided by 2 and multiplied by the total bandwidth available exceeding 20 MHz. (for example CA with 10+10 MHz and 4 antenna TX from network and 4 antenna RX in the UE could qualify). In this way again it would be ensure that there are benefits from the end user point of view; and The UE could effectively consider the LTE-Advanced service indicator valid and to be shown to the end user if the expected peak data rate to be achieved (in the current position of the UE in terms of which bands the UE is hearing, etc.) would be higher than provided with 2 stream transmission and over 20 MHz of spectrum (or for example 10 MHz or 15 MHz those bandwidth are used by the operator for operation in a single band), both from the UE capability as well as from the network capability.

Another dimension being considered for the LTE-Advanced is the higher order modulation, such as 256 QAM, intended to be used rather in small cell environment. The UE could consider availability of sufficient bandwidth (with or without carrier aggregation) and availability of higher modulation order than 64 QAM in the UE, when that has been detected to be available in network as well, with the detection being based either on the signaling from the network or on actually experiencing 256 QAM being used in the cell or within the tracking area. Considering higher modulation order than 64 QAM sufficient for setting up the LTE-Advanced service indication could be also connected to the sufficient signal quality, i.e. having additionally high enough LTE RSRQ or RSRP as measured from the LTE reference signals or then based on the CSI/CQI reporting criteria, whether TIE would indicate to the eNodeB that 256 QAM is usable.

In these ways it would be ensured that when LTE-Advanced service indication is shown to the end-user on display the user is able to obtain better service from the data rate point of view than what "regular" LTE would provide. This would provide more predictable service and service expectation for the end-user. A mobile end-user could also select to use certain applications in specific locations where such indication is available. An indicator can be displayed in view of these determinations.

FIG. 2 illustrates a communication flow chart of a method in accordance with the exemplary embodiments of the invention. In FIG. 2 the user equipment (UE) is camped on a cell which includes an eNodeB1. At step 205 the UE may receive information including an indication of an LTE-Advanced coverage area from a device of the cell, such as from the eNodeB1. In an embodiment as shown in step 210 the UE may alternatively or concurrently receive such information from an eNodeB(x) associated with such an LTE-Advanced coverage area, or from any device such as the network access node 10-1 of FIG. 1. In accordance with the exemplary embodiments as shown in step 215 of FIG. 2 the UE uses at least the information received to perform determinations regarding whether accessing the LTE-Advanced coverage area as indicated to the UE would actually improve a current operational performance by the user equipment. In accordance with the exemplary embodiments as illustrated for step 220 these determinations can include determining whether there is carrier aggregation support, determining bandwidth of component carriers associated with the LTE-Advanced coverage area, determining information regarding antenna usage for a downlink MIMO configuration associated with the LTE-Advanced coverage area, and/or determining a bandwidth of parallel streams associated with the LTE-Advanced coverage area. Then in accordance with the exemplary embodiments of the invention, as illustrated in step 225 of FIG. 2 the UE can display an indication of the long term evolution advanced service network, and/or the user equipment can access the long term evolution advanced service network.

Further, in accordance with the exemplary embodiments of the invention the eNodeB1 can be part of a different network layer of a same network where a eNodeB(x) is located. Further, the eNodeB1 and/or the eNodeB(x) may include an access point or another type of network access node.

FIG. 3 illustrates a general cell location diagram and provides further detailed information with regards to operations performed and information used in steps 205, 215, and/or 220 as described above with regards to FIG. 2. As illustrated in FIG. 3, in step 305 the UE receives an indication of an LTE advanced coverage area. This indication may come from an area serving the UE such as area 345, or may come from an area, such as area 350, wherein the LTE advanced coverage area and/or features may be located. Then as indicated in step 310 the UE is performing determinations in accordance with the exemplary embodiments as described herein.

As similarly indicated above area 345 and area 350 can be part of a different network layer of a same network (e.g., cell/network 300) where a eNodeB(x) is located. Further, the eNodeB1 and/or the eNodeB(x) may include an access point or another type of network access node.

Figure 4A:
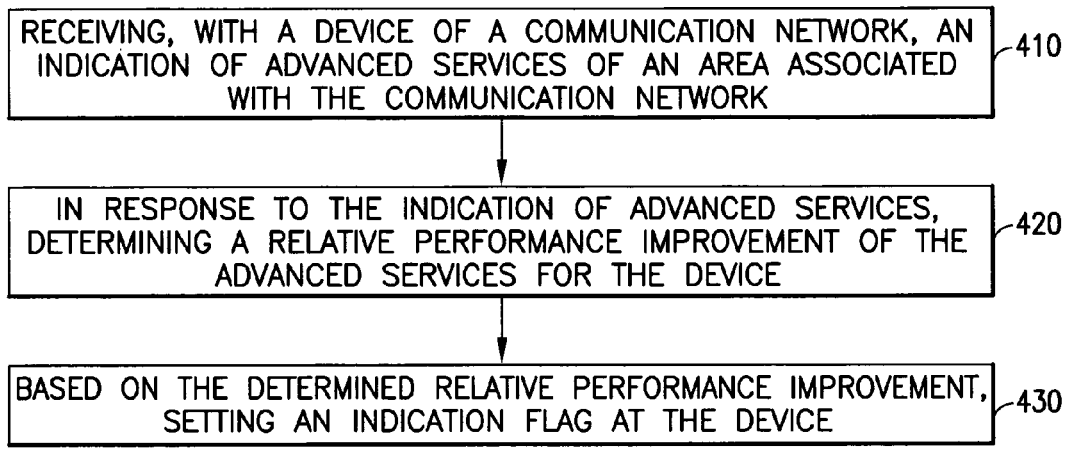
FIGS. 4A and 4B each illustrate a block diagram showing a method in accordance with the exemplary embodiments of the invention.
Figure 4B:
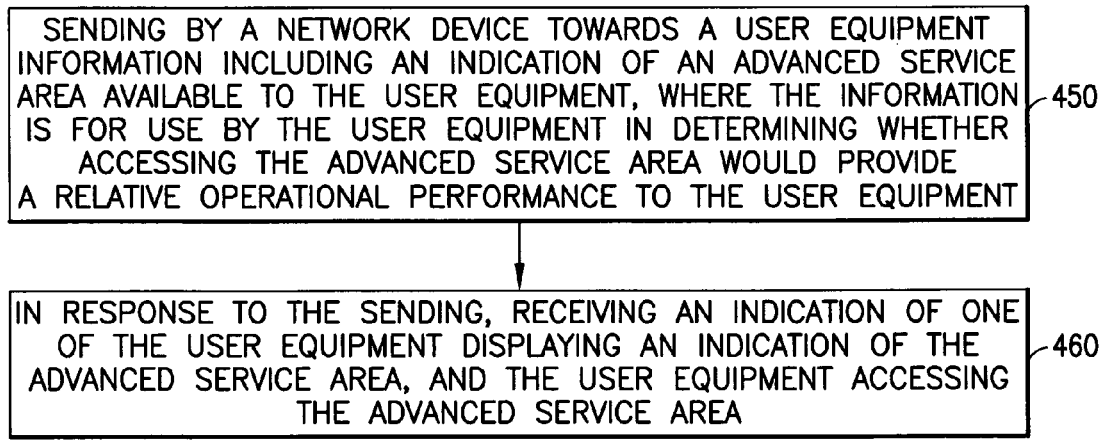

FIGS. 4A and 4B include block diagrams each illustrating a method in accordance with the exemplary embodiments of the invention which may be implemented by any of an apparatus, and executable computer program.

In regards to FIG. 4A, at block 410 there is a step of receiving, with a device of a communication network, an indication of advanced services of an area associated with the communication network. Then at step 420 of FIG. 4B there is a step, in response to the indication of advanced services, determining a relative performance improvement of the advanced services for the device. Then at step 430 there is a step, based on the determined relative performance improvement, of setting an indication flag at the device.

In accordance with the exemplary embodiments of the invention as described above, the advanced services comprise long term evolution network advanced services.

In accordance with the exemplary embodiments of the invention as described in the paragraphs above, the advanced services comprises carrier aggregation services.

In accordance with the exemplary embodiments of the invention as described in the paragraphs above, the determining relative performance comprises determining that an available aggregated bandwidth of the carrier aggregation services is higher than current available bandwidth of the device.

In accordance with the exemplary embodiments of the invention as described in the paragraphs above, the device is using single carrier service, and wherein the determining relative performance comprises determining that an available aggregated bandwidth of the carrier aggregation services is higher than the single carrier service.

In accordance with the exemplary embodiments of the invention as described in the paragraphs above, the determining relative performance comprises determining that a parallel number of data streams of the carrier aggregation services is using a multiple input multiple output configuration of two or more antenna.

In accordance with the exemplary embodiments of the invention as described in the paragraphs above, there is determining whether the carrier aggregation services of the area are valid for the device, comprising determining whether the device supports the multiple input multiple output configuration of the carrier aggregation services of the area.

In accordance with an exemplary embodiment of the invention as described above there is an apparatus comprising: means for receiving [100-E1, 100-D1, 10-D1, and/or 10-F1], with a device [UE100 and/or Node 10-1], of a communication network, an indication of advanced services of an area associated with the communication network; means, in response to the indication of advanced services, for determining [100-A1 to G1 and/or 10-A1 to G1] a relative performance improvement of the advanced services for the device; and means, based on the determined relative performance improvement, for setting [100-A1 to G1 and/or 10-A1 to G1] an indication flag at the device. Further, at least these means as described herein are configurable to perform any of the exemplary operations as in the paragraphs above.

In regards to FIG. 4B, at block 450 there is a step of sending by a network device towards a user equipment information including an indication of an advanced service area available to the user equipment, where the information is for use by the user equipment in determining whether accessing the advanced service area would provide a relative operational performance to the user equipment. Then at step 460 there is, in response to the sending, receiving an indication of one of the user equipment displaying an indication of the advanced service area, and the user equipment accessing the advanced service area.

In accordance with the exemplary embodiments of the invention as described in the paragraph above, the advanced service area comprises a long term evolution network advanced services area.

In accordance with an exemplary embodiment of the invention as described above there is an apparatus comprising: means for sending [100-E1, 100-D1, 10-D1, and/or 10-F1], by a network device [UE100 and/or Node 10-1] towards a user equipment information including an indication of an advanced service area available to the user equipment, where the information is for use by the user equipment in determining whether accessing the advanced service area would provide a relative operational performance to the user equipment; and means, in response to the sending, for receiving [100-E1, 100-D1, 10-D1, and/or 10-F1] an indication of one of the user equipment displaying [100-A1 to G1 and/or 10-A1 to G1] an indication of the advanced service area, and the user equipment accessing the advanced service area. Further, at least these means as described herein are configurable to perform any of the exemplary operations as in the paragraphs above.

In general, the various embodiments of the user equipment, such as the user equipment 100, can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by a data processor of the user equipment 100, such as with processor(s) 100-A1, or by hardware, or by a combination of software and hardware. Further in this regard it should be noted that the various steps and/or blocks of the diagrams of FIGS. 2, 3, 4A, and 4B may represent program steps, or interconnected logic circuits, blocks and functions, or a combination of program steps and logic circuits, blocks and functions. It is noted that any of these devices may have multiple processors (e.g. RF, baseband, imaging, user interface) which operate in a slave relation to a master processor. The teachings may be implemented in any single one or combination of those multiple processors.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radiofrequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving, with a device of a communication network, an indication of advanced services of an area associated with the communication network, wherein the advanced services comprises carrier aggregation services;
   in response to the indication of advanced services, determining, by the device, a performance improvement of the advanced services for the device and a capability of the device to support the advanced services, wherein the determining the performance improvement comprises determining that an available aggregated bandwidth of the carrier aggregation services is higher than a current available bandwidth of the device; and
   based on the determined performance improvement and the capability of the device to support the advanced services, displaying an indication of the advanced services on a display of the device.

2. The method of claim 1, wherein the advanced services comprise long term evolution network advanced services.

3. The method of claim 1, comprising:
   determining that the device has moved out of the area; and
   based on the determining that the device having moved out of the area, removing the indication of the advanced services from the display of the device.

4. The method of claim 1, wherein the device is using single carrier service, and wherein the determining the performance improvement comprises determining that an available aggregated bandwidth of the carrier aggregation services is higher than the single carrier service.

5. The method of claim 1, wherein the determining the performance improvement comprises determining that a parallel number of data streams of the carrier aggregation services is using a multiple input multiple output configuration of two or more antenna.

6. The method of claim 1, wherein the determining the performance improvement comprises determining whether the carrier aggregation services of the area are valid for the device, the method further comprising determining whether the device supports the multiple input multiple output configuration of the carrier aggregation services of the area.

7. The method of claim 1 performed by a non-transitory computer readable medium embodying computer program code, and the computer program code executed by at least one processor.

8. The method of claim 1, wherein the capability of the device to support the advanced services is based on at least one of reference signal received power, reference signal received quality, and channel state information measurements of the advanced services by the device as compared to a threshold.

9. An apparatus comprising:
   at least one processor; and
   at least one memory including computer program code, where the at least one memory and the computer program code are configured, with the at least one processor, to cause the apparatus to at least:
   receive with a device an indication of advanced services of an area associated with the communication network, wherein the advanced services comprises carrier aggregation services;
   in response to the indication of advanced services, determine a performance improvement of the advanced services for the device and a capability of the device to support the advanced services, wherein the determining the performance improvement comprises determining that an available aggregated bandwidth of the carrier aggregation services is higher than current available bandwidth of the device; and
   based on the determined performance improvement and the capability of the device to support the advanced services, display an indication of the advanced services on a display of the device.

10. The apparatus of claim 9, wherein the advanced services comprise long term evolution network advanced services.

11. The apparatus of claim 9, wherein the at least one memory including the computer program code is configured with the at least one processor to cause the apparatus, to
   determine whether the device has moved out of the area; and
   based on determining that the device has moved out of the area, remove the indication of the advanced services from the display of the device.

12. The apparatus of claim 9, wherein the device is using single carrier service, and wherein the determining the performance improvement comprises determining that an available aggregated bandwidth of the carrier aggregation services is higher than the single carrier service.

13. The apparatus of claim 9, wherein the determining the performance improvement comprises determining that a parallel number of data streams of the carrier aggregation services is using a multiple input multiple output configuration of two or more antenna.

14. The apparatus of claim 9, wherein the determining the performance improvement comprises determining whether the carrier aggregation services of the area are valid for the device, and wherein the at least one memory including the computer program code is configured with the at least one processor to cause the apparatus to determine whether the device supports the multiple input multiple output configuration of the carrier aggregation services of the area.

15. A method comprising:
sending by a network device towards a user equipment information including an indication of an advanced service area available to the user equipment, wherein the advanced service area comprises carrier aggregation services, wherein the information is for use by the user equipment in determining whether accessing the advanced service area would provide an operational performance improvement to the user equipment and whether the user equipment is capable of supporting at least the carrier aggregation services of the advanced service area, wherein an operational performance improvement comprises an available aggregated bandwidth of the carrier aggregation services is higher than a current available bandwidth of the device; and
in response to the sending, receiving an indication of the user equipment displaying, based on a determined performance improvement and capability of the user equipment to support at least the carrier aggregation services of the advanced service area, an indication of the advanced service area on a display of the user equipment, and the user equipment accessing the advanced service area.

16. The method of claim 15, wherein the advanced service area comprises a long term evolution network advanced services area.

17. The method of claim 15 performed by a non-transitory computer readable medium embodying computer program code, and the computer program code executed by at least one processor.

18. An apparatus comprising:
at least one processor; and
at least one memory including computer program code, where the at least one memory and the computer program code are configured, with the at least one processor, to cause the apparatus to at least:
send towards a user equipment information including an indication of an advanced service area available to the user equipment, wherein the advanced service area comprises carrier aggregation services, wherein the information is for use by the user equipment in determining whether accessing the advanced service area would provide an operational performance improvement to the user equipment and whether the user equipment is capable of supporting at least the carrier aggregation services of the advanced services, wherein an operational performance improvement comprises an available aggregated bandwidth of the carrier aggregation services is higher than a current available bandwidth of the device; and
in response to the sending, receive an indication of the user equipment displaying, based on a determined performance improvement and capability of the user equipment to support at least the carrier aggregation services of the advanced service area, an indication of the advanced service area on a display of the user equipment, and the user equipment accessing the advanced service area.

19. The apparatus of claim 18, wherein the advanced service area comprises a long term evolution network advanced services area.

* * * * *